Oct. 21, 1941.     V. S. SHAW ET AL     2,259,781
HYDRAULIC INJECTION MOLDING PRESS
Filed April 29, 1935     8 Sheets-Sheet 1

FIG.1.

Inventors
VICTOR S. SHAW,
LESLIE S. HUBBERT,
BY
Toulmin & Toulmin
Attorneys

Oct. 21, 1941.    V. S. SHAW ET AL    2,259,781
HYDRAULIC INJECTION MOLDING PRESS
Filed April 29, 1935    8 Sheets-Sheet 3

FIG. 4.

Inventors
VICTOR S. SHAW,
LESLIE S. HUBBERT,
BY
Toulmin & Toulmin
Attorneys Oct. 21, 1941.   V. S. SHAW ET AL   2,259,781
HYDRAULIC INJECTION MOLDING PRESS
Filed April 29, 1935   8 Sheets-Sheet 7

Patented Oct. 21, 1941

2,259,781

UNITED STATES PATENT OFFICE 2,259,781

HYDRAULIC INJECTION MOLDING PRESS

Victor S. Shaw, Cardington, and Leslie S. Hubbert, Edison, Ohio, assignors, by mesne assignments, to The Hydraulic Press Corporation, Inc., Wilmington, Del., a corporation of Delaware Application April 29, 1935, Serial No. 18,712

16 Claims. (Cl. 18—30)

This invention relates to molding presses, and in particular, to injection molding presses for molding thermo-plastic materials. By thermoplastic materials is meant materials, such as cellulose acetate, which do not cure or set by reason of heating, but soften and can be remelted, as contrasted with infusibly thermo-setting resins, such as phenol resins, which undergo an irreversible reaction upon heating, and permanently set.

One object of our invention is to provide an injection molding press having separable die members supported upon floating supports, each of which die members is actuated by hydraulic cylinders, one for clamping and the other for cushioning.

Another object is to provide such a press wherein one of the die members is caused to force the other die member into engagement with an injector, whereupon the molding materials are injected into the interior chamber of the dies.

Another object is to provide such a press wherein the die members are clamped together by hydraulic means, and held together by such means during the injection of the molding materials.

Another object is to provide an injection molding press having a pair of movable die members which are movable into an injection position with an injector, the injector having an independently movable feeding plunger for forcing the molding materials from the injector into the chamber of the die members.

Another object is to provide an injection molding press of the type described in the object immediately above, wherein the operation of the injector is made substantially instantaneous by the provision of a flash pressure device for storing up energy to be released at the instant of injection.

Another object is to provide, in such a press, a flash pressure storage device having a movable piston with a projection thereon adapted to close the chamber when the piston is in engagement with one end of the device, thereby preventing the escape of the gas with which the device is charged.

Another object is to provide an injection molding press having twin die members supported on independent hydraulic pistons and movable into injection relationship with an injecting device, the hydraulic pistons upon which one die member is supported being arranged to provide a cushioning effect which will bring the die member into contact with the injector, but which will relieve the injector from sustaining the entire thrust of the opposite die member as brought about by the other hydraulic piston.

Another object is to provide an injection molding press circuit including a press, as previously described, together with a low pressure pump for initiating the movements of the press, and a high pressure pump for carrying on the molding operation as well as storing up energy in the flash pressure device, this energy being subsequently utilized for the operation of the injector.

Another object is to provide such a circuit as described immediately above, wherein the high pressure pump is arranged with a pressure control of such a kind as to permit the application of two different pressures from a single pump, the lower pressure being utilized to charge the flash pressure device and the higher pressure beyond that utilized by the flash pressure device serving to clamp the die members together at a higher pressure.

Hydraulic circuit and parts thereof

Figure 1:
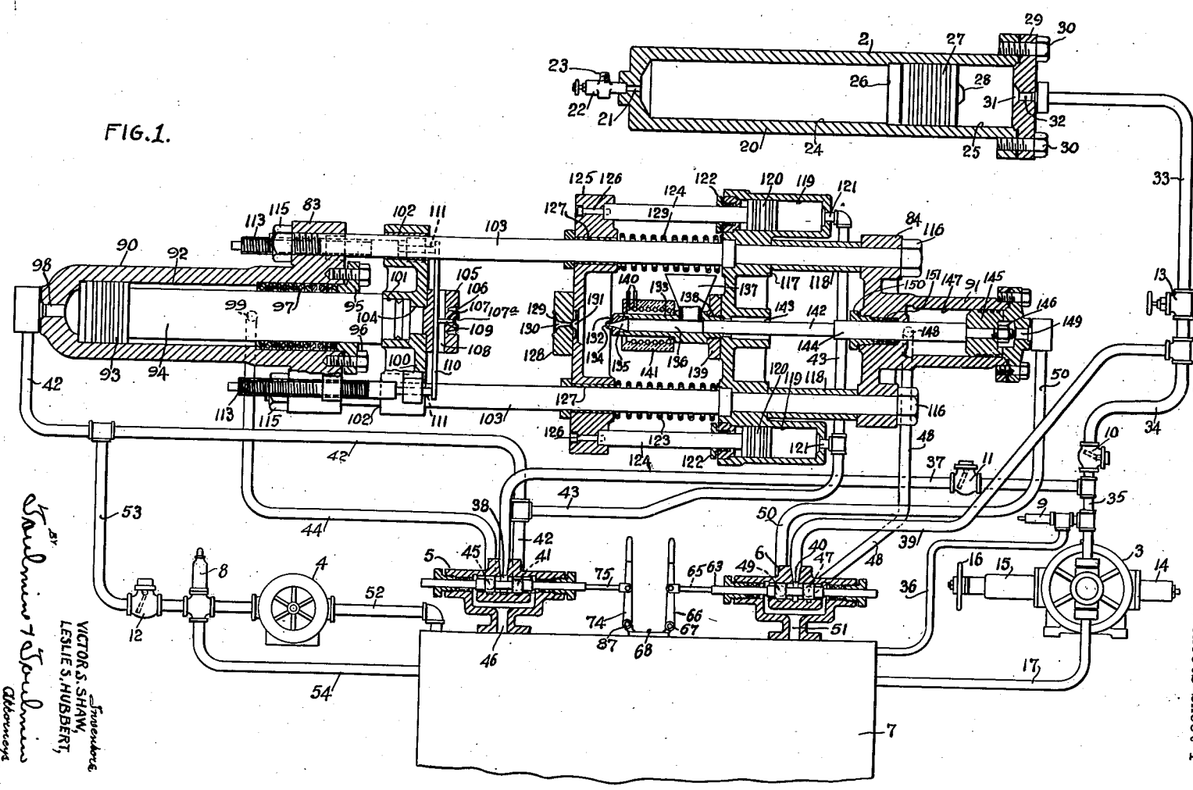
Figure 1 is a diagrammatic vertical layout view of the injection molding press and circuit of our invention, in staggered section to place the principal parts thereof in a common vertical plane and laid out in retracted positions, in side elevation.

Referring to the drawings in detail, Figure 1 shows the various working parts of the injection molding press of our invention, laid out one above the other, together with the circuit for actuating the press. This circuit contains the press proper, generally designated 1; a flash pressure device, generally designated 2; a high pressure variable delivery pump, generally designated 3; a low pressure constant delivery pump, generally designated 4; a clamp controlling valve, generally designated 5 and an injector controlling valve, generally designated 6.

The circuit also contains a reservoir 7, a pressure relief valve 8, a safety valve 9, a check valve 10, permitting free flow in a vertical direction, and check valves 11 and 12, permitting free flow in a left-hand direction. A shut-off valve 13 is also provided. The details of the pumps 3 and 4, the valves 5 and 6 and the other parts 7 to 13, inclusive, do not constitute the present invention.

The high pressure pump 3 is of the variable delivery type and is of the class wherein a primary rotor contains cylinders having pistons operatively connected to a secondary rotor, rotatable about an independent axis. The secondary rotor is mounted in a shift ring and is movable under sufficient pressure into a neutral position, where delivery from the pump will entirely cease. The details of this control mechanism likewise form no part of the present invention.

The actuating piston for moving the secondary rotor into a neutral position is contained in the cylinder 14 at the right-hand side of the pump 3, whereas the cylinder 15 on the left side thereof contains a spring for varying the pressure at which the device becomes operative, this pressure being varied by turning the hand wheel 16. The fluid for the operation of the pump 3 is received through the suction pipe 17, running from the reservoir 7 to the pump 3. Accordingly, when the pressure delivered by the pump 3 rises to a sufficient height, the piston within the cylinder 14 will overcome the resistance of the spring in the cylinder 15 and force the secondary rotor of the pump into its neutral position. A disclosure of such mechanism will be found in the copending application of Walter Ernst, Ser. No. 632,980, filed September 13, 1932.

The flash pressure device 2 consists of a cylinder 20 having at one end a bore 21 adapted to receive a valve 22, having a connection 23 to a source of nitrogen gas under high pressure (not shown). This source of gas may consist, for example, of a metal cylinder or bottle of the type in which such gas is commercially supplied. The cylinder 20 is provided with bores 24 and 25, of slightly different diameters so that an annular shoulder 26 exists between the larger bore, at the right-hand end of the cylinder, and the smaller bore, at the left-hand end.

Reciprocably mounted to freely float within the larger bore is a piston 27 having a frustroconical projection 28 on the right-hand side. The right end of the cylinder 20 is closed by a cylinder head 29, as by the machine screws 30. This head 29 is provided with a frustro-conical depression 31 of corresponding configuration to that of the frustro-conical projection 28. The depression 31 opens into a bore 32 to which is attached the pipe 33, leading to the shut-off valve 13. From the shut-off valve 13 the pipes 34 and 35 lead to the pressure delivery side of the high pressure pump 3.

The pipe 35 also is provided with the safety valve 9, having a discharge pipe 36 leading back to the reservoir 7. The check valve 10, previously mentioned, is located between the sections of pipe, designated 34 and 35, and provides for a free flow in an upward direction only. Leading from the pipe 35 is a pipe 37, containing the check valve 11. The latter, as previously stated, permits a free flow to the left only. The pipe 37 leads to the central port 38 of the clamp controlling valve 5. Similarly, a pipe 39 leads from the pipe 34 to the central port 40 of the injector controlling valve 6.

Running from the right-hand port 41 of the clamp controlling valve 5 is a pipe 42, leading to the left-hand side of the press clamping piston, hereinafter described. From the line 42 a branch line 43 runs to the right-hand ends of the press cushion cylinders, described later. The line 44 leads from the left-hand port 45 of the clamp controlling valve 5 to the right-hand side of the clamping piston mentioned above, and as described later. The bottom port 46 of the clamp controlling valve 5 leads to the fluid reservoir 7. In a similar manner the injector controlling valve 6 is provided with a right-hand port 47 from which the line 48 runs to the left-hand side of the injector plunger, described later. From the left-hand port 49 of the injector controlling valve 6 the line 50 runs to the right-hand end of this injection plunger. The bottom port 51 thereof discharges into the reservoir 7.

Leading from the left-hand side of the reservoir 7 is a suction line 52 for the low pressure pump 4. The discharge or pressure line 53 thereof contains the check valve 12, having a free flow to the left only. The pressure line 53 also contains the pressure relief valve 8, which serves at a sufficient pressure to discharge the flow of the low pressure pump 4 into the relief valve discharge line 54. Beyond the pressure relief valve 8 the line 53 runs to join the pipe 42 from the clamp controlling valve 5.

The clamp controlling valve 5 and the injector controlling valve 6 are of similar construction. The latter is shown in vertical section in Figure 3, and is described for convenience. This valve consists of a casing 60 having a bore 61 therethrough, and closed by the bored plugs 62 threaded into the ends thereof. In this bore 61 is reciprocably mounted the valve rod 63. A packing 64 on the inner side of the plugs 62 prevents the escape of fluid around the valve rod 63. One end of the valve rod 63 is connected by the connecting rod 65 to the control lever 66, the latter being pivotally mounted, as at 67, to a base 68. The valve rod 63 is provided with enlarged heads 69 and 70. The bore 61 is provided with enlargements 71 and 72 adjacent the ports 49 and 47, previously mentioned. A similar enlargement 73 is provided adjacent the central port 40.

Figures 2, 3:
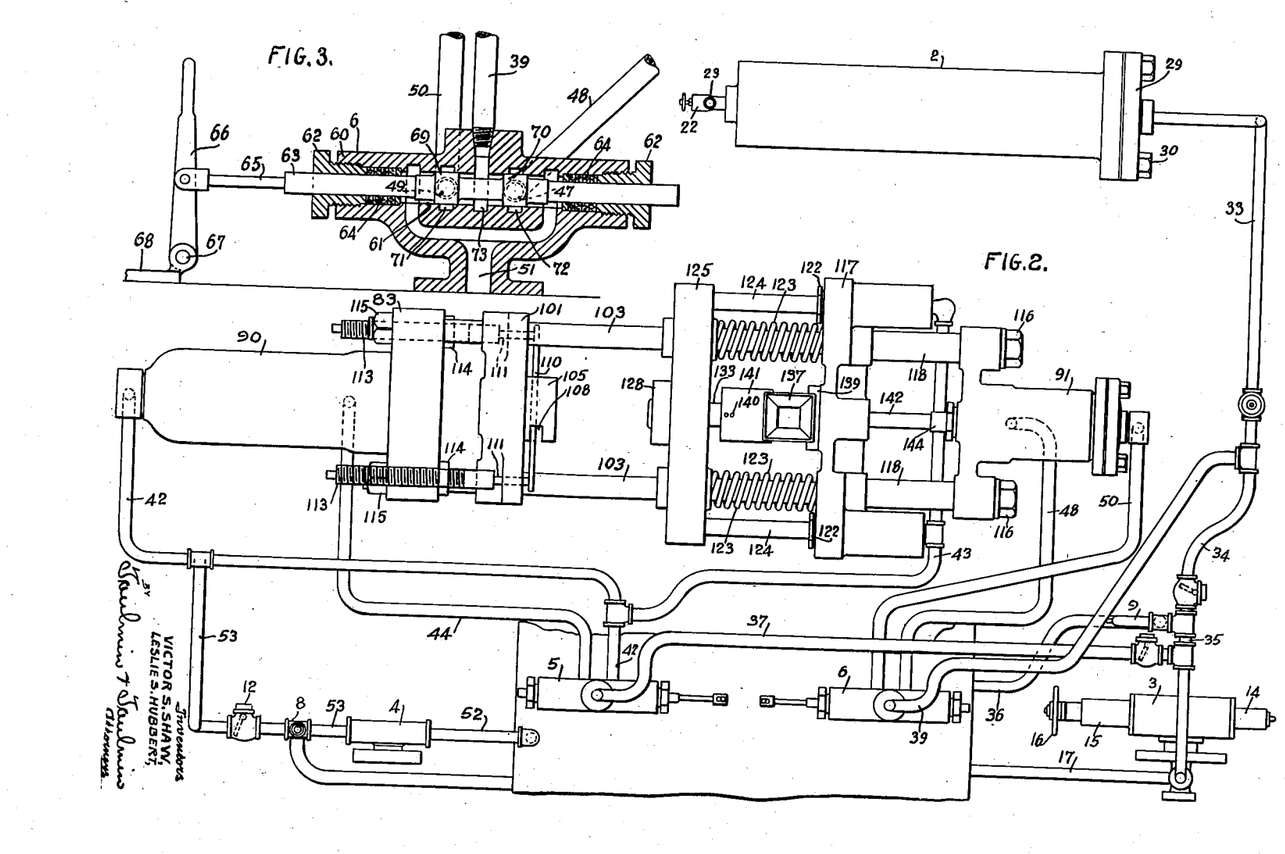
Figure 2 is a layout plan view of the mechanism shown in Figure 1.
Figure 3 is a side elevation, partly in section, of one of the control valves for the press.

In the position of the valves shown in Figure 3 the discharge from the pipe 39 will be cut off from continuing in either direction. If, however, the valve member 63 is moved to the right, the discharge from the pipe 39 will pass out through the pipe 48, whereas any pressure fluid in the line 50 will pass through the left end of the bore 61 and downward through the bottom port 51, into the reservoir 7. If, however, the valve member 63 is shifted to its extreme left-hand position the discharge from the pipe 39 passes outward through the pipe 50, and any pressure fluid in the pipe 48 is discharged through the bottom port 51 into the reservoir 7. A similar action occurs in the clamp controlling valve 46, and similar parts are similarly designated. In order to distinguish the control levers, however, that for the injector controlling valve is designated 66, whereas that for the clamp controlling valve is designated 74 (Figure 1), and the connecting rod of the latter is designated 75.

Injection molding press construction

Figure 4:
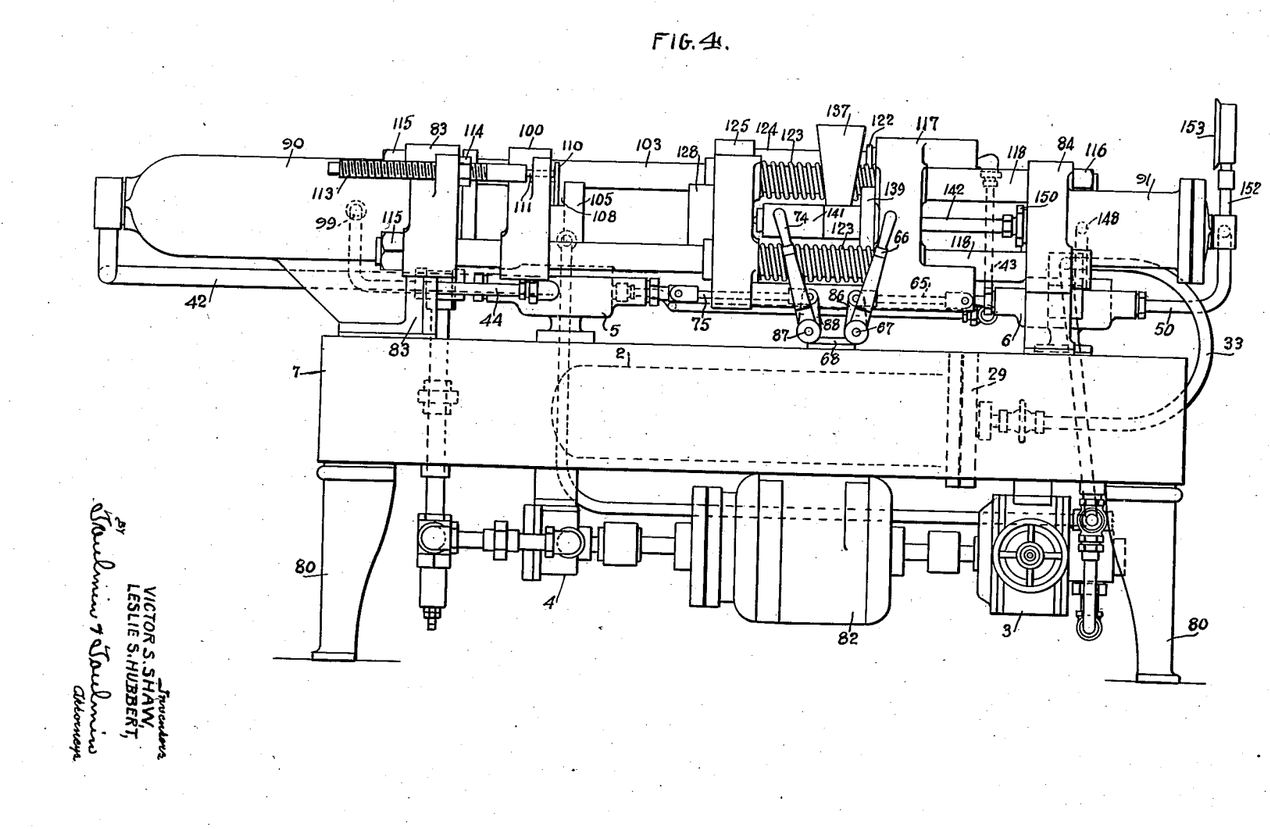
Figure 4 is a side elevation of the assembled press shown in lay-out view in Figures 1 and 2.
Figure 5:
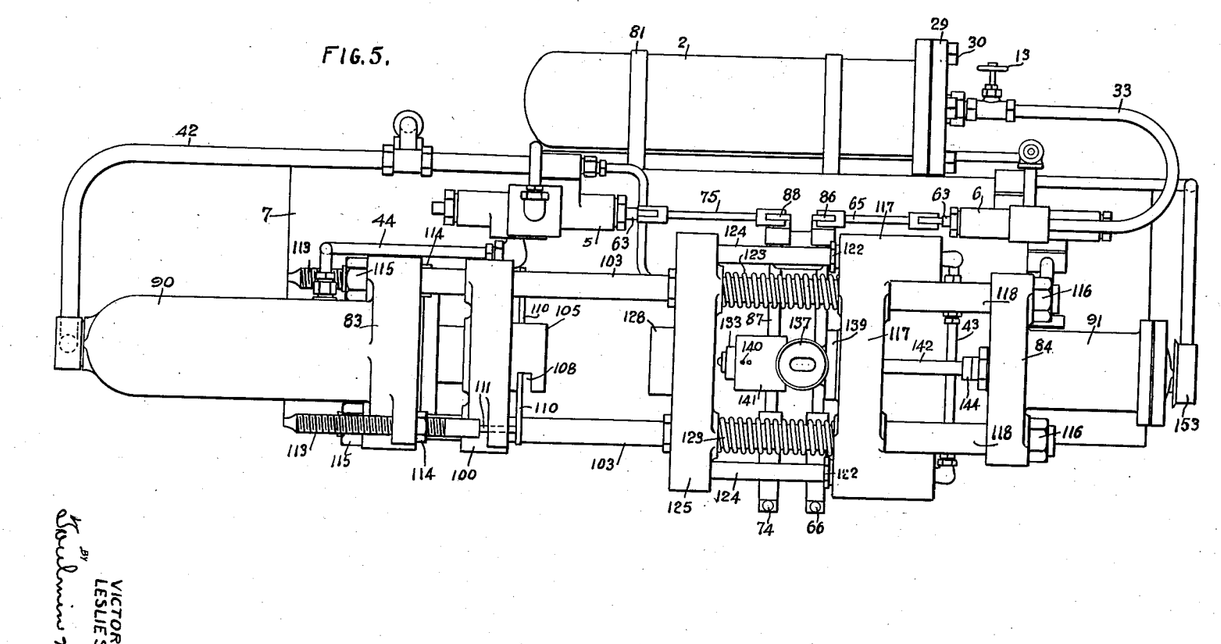
Figure 5 is a plan view of the press shown in Figure 4.
Figure 6:
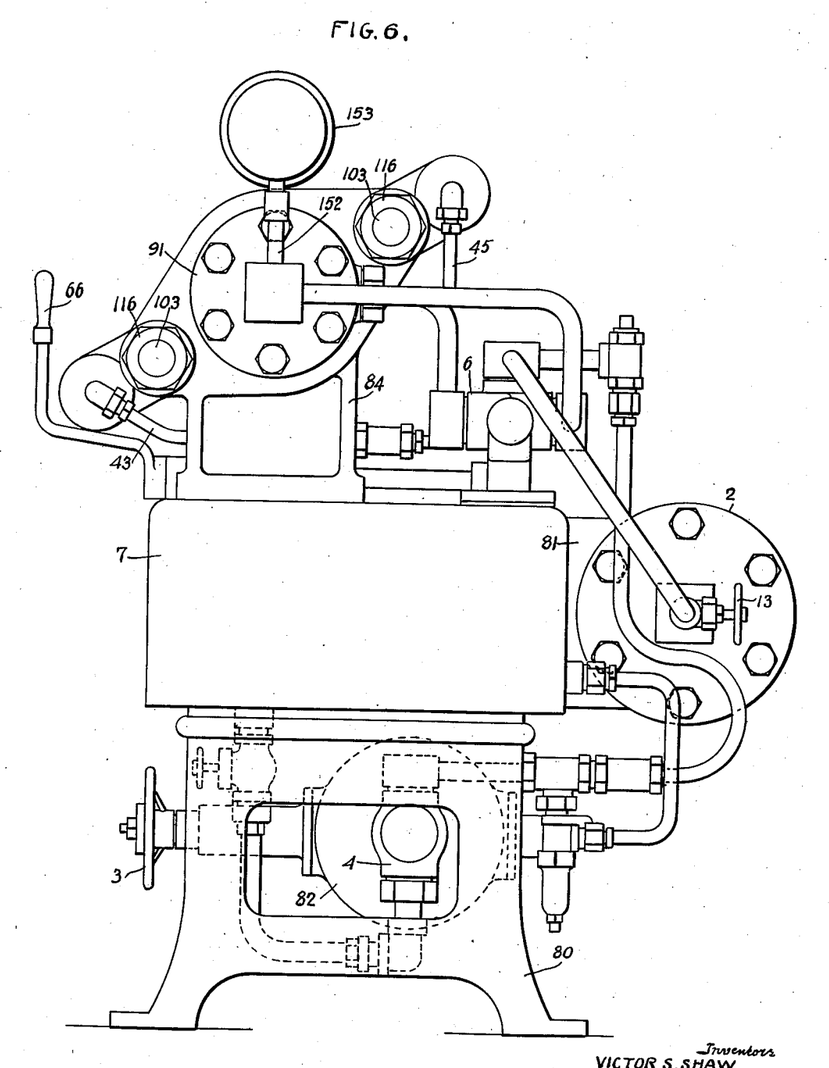
Figure 6 is a right-hand end elevation of the press shown in Figure 4.
Figure 7:
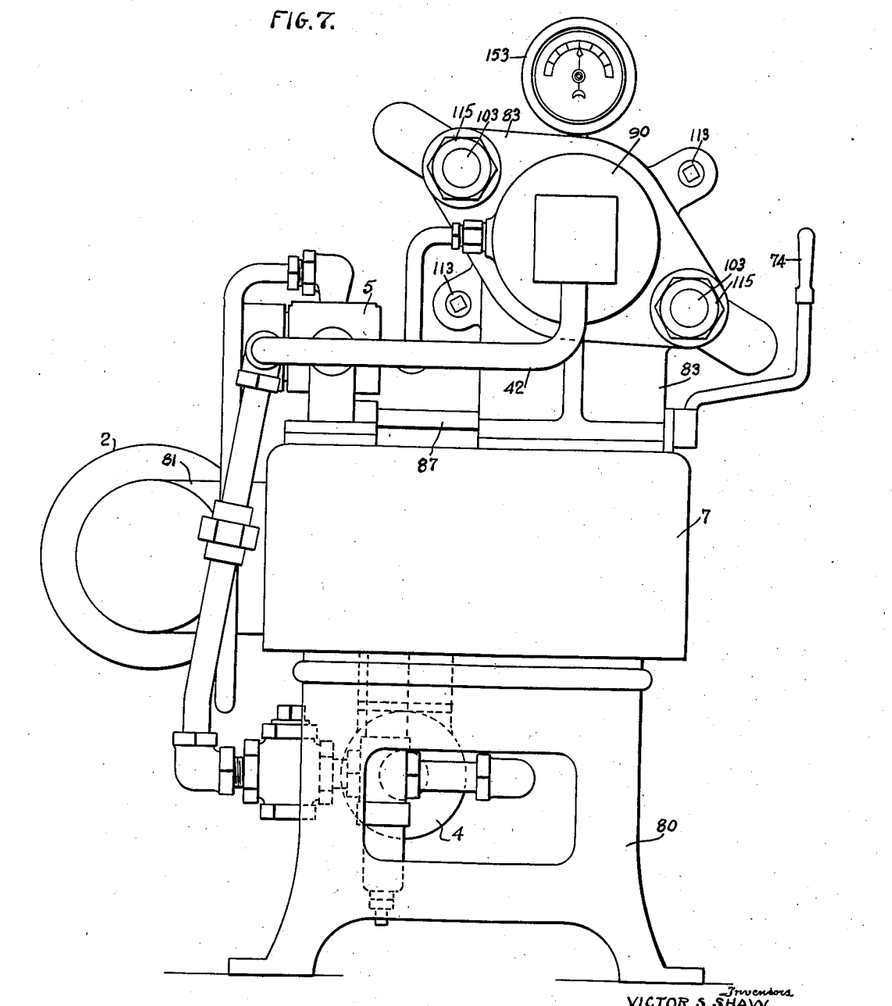
Figure 7 is a left-hand end elevation of the press shown in Figure 4.

The injection molding press of our invention, as used in the previously-described circuit, consists of a base frame 80 (Figures 4 to 7, inclusive), on which is placed the reservoir 7, the latter serving as a bed for the support of the valves 5 and 6, previously described, as well as for the main portion of the press. The reservoir 7 also carries brackets 81 (Figures 5 and 7), serving to support the flash pressure device 2 at the rear of the machine. The reservoir 7 and the base frame 80 likewise serve to support the high pressure pump 3 and the low pressure pump 4, together with their accessories (Figure 4). The pumps 3 and 4 are driven by the electric motor 82.

Mounted on the left-hand end of the reservoir 7 is a bracket 83 serving to support the left-hand end of the press. Similarly the right-hand end of the reservoir 7 carries a bracket 84 which serves to support the right-hand end of the press (Figure 4). The top of the reservoir 7 further supports the valve lever base 68, carrying the valve levers 66 and 74, as previously described. The valve lever 66 is mounted upon the shaft 67 which terminates in a crank arm 86, to which the connecting rod 65 is attached. Similarly, the valve lever 74 is mounted upon the shaft 87, terminating in a crank arm 88, to which is attached the connecting rod 75.

The press proper, as mounted on the brackets 83 and 84, consists of a clamping cylinder 90 supported by the left-hand bracket 83, and an injector operating cylinder 91, mounted on the right-hand bracket 84 (Figures 1 and 4). The clamping cylinder 90 is provided with a bore 92 containing the clamping piston 93 having a piston rod 94 passing through the gland 95, secured to the cylinder 90 by the bolts 96. A packing 97 prevents the escape of fluid from the clamping cylinder 90. The latter is provided at its left end with a port 98, and at its right end with a port 99.

The right-hand end of the clamping piston rod 94 (Figure 1) is provided with a die head 100, which contains the socket 101 serving for the reception of the reduced end of the piston rod 94 together with bores 102 through which pass the strain rods 103, thereby forming a reciprocable mounting for the die head 100 upon the strain rods 103. The die head 100 is likewise provided with a central bore 104 serving to receive the left-hand die member 105. The latter is provided with recesses, generally designated 106, serving to receive and mold the materials to the desired shape. The die member 105 also contains a longitudinal bore 107 communicating with a transverse passageway 108 (Figure 1). Reciprocably mounted in the longitudinal bore 107 is an ejector pin 109, extending into the reversely tapered recess 107a, and terminating at its other end in a transverse rod 110 mounted in the transverse passageway 108. The rod 110 is provided at its ends with contact pins 111. The latter pass through the bores 112 in the die head 100, whereby the rod 110 and the ejector pin 109 are reciprocably mounted and guided in the die member 105 and the die head 100.

The bracket 83 at its upper end is provided with threaded bores adapted to receive the contact screws 113, which are held in adjusted position by the locknuts 114. The right-hand ends of these contact screws 113 are positioned to engage the left-hand ends of the contact pins 111 when the clamping piston 93 reaches the extreme left-hand limit of its reciprocation. The position of the ejector parts shown in Figure 1 is such that the clamping piston 93 has not quite reached its left-hand limit of reciprocation so that the ejector contact pins 111 are in engagement with the contact screws 113 but are not yet being pushed forward thereby. When the piston 93 continues its reciprocation to the left (Figure 1), the transverse rod 110 will remain stationary while the die head 105 moves backward to the left, thereby causing the ejector pin 109 to eject the contents of the die member 105.

The strain rods 103 are secured to the bracket 83 by the nuts 115, threaded onto the ends of the rods, whereas the right-hand ends of these rods 103 are secured to the bracket 84 by the nuts 116 (Figure 1). Supported on the strain rods 103, near the right-hand end thereof (Figure 1), is a casing 117 spaced apart from the bracket 84 by the spacing collars 118. The casing 117 is provided on its opposite sides with cylinder bores 119 serving to reciprocably contain the cushion pistons 120. The right-hand ends of these cylinder bores 119 are connected by the ports 121 to the pipe 43, previously described. The left-hand ends of the cylinder bores 119, however, are closed by the cylinder heads 122.

Through the cylinder heads 122 run the piston rods 124 from the pistons 120 to the die head 125. The latter is provided with bores 126 arranged to receive the ends of the piston rods 124. The die head 125 is also provided with bores 127 surrounding the strain rods 103, and serving to support the die head 125 reciprocably upon the strain rods 103. The die head 125 is urged to the left by the coil springs 123 encircling the strain rods, and mounted between the casing 117 and the die head 125. The die head 125 carries on its left-hand face the die member 128. The latter is provided with a recess 129, which is the counterpart of the recess 106 in the die member 100, the two recesses 106 and 129 forming the complete chamber of the combined dies.

The die recess 129 is connected by a longitudinal passageway 130 to a recess 131 on the opposite side of the die head 125. The recess 131 is of a shape corresponding to and of exactly opposite configuration to the nozzle 132 of the injector cylinder 133 (Figure 1). The nozzle 132 is provided with a bore 134 which is internally expanded, as at 135, to the point where it joins the internal bore 136 of the injector cylinder 133. A hopper 137 communicates with the injector cylinder bore 136 and serves for the placing of molding materials therein. At the rear the injector cylinnder 133 is threaded into a bore 138 in a base ring 139, the latter being secured to the casing 117.

The injector cylinder 133 is surrounded by an electrical heating element consisting of resistance wires 140 which are, in turn, surrounded by an insulating casing 141. When suitably energized from a source of electric current this resistance winding 140 serves to heat the injector cylinder 133 and to maintain its contents in a plastic or fluid condition (Figure 1).

Reciprocably mounted in the injection cylinder bore 136 is the injection plunger 142, passing through the bore 143 in the casing 117. The injection plunger 142 terminates at its right-hand end in the piston rod 144, which at its opposite end carries the piston head 145 secured to the threaded end by the nut 146. The piston head 145 reciprocates in the cylinder bore 147 within the injector operating cylinder 91. The latter is provided at its left-hand end with a port 148 connecting it with the line 48 from the injector controlling valve 6, previously described. Similarly, the opposite end of the injector operating cylinder 91 is provided with a port 149 communicating with the line 50, running to the same valve.

A gland 150 and a packing 151 surround the piston rod 144 and serve to prevent leakage from the injector operating cylinder 91. A pipe 152 is provided with a pressure gauge 153 (Figure 4), which is hydraulically connected with the port 149 and serves to indicate the pressure within the injector operating cylinder 91.

*Operation*

In the operation of the injection molding press of our invention, the parts are retracted into positions shown in Figure 1. This is accomplished by a suitable manipulation of the valves 5 and 6, as described later. The thermo-plastic material, such as cellulose acetate, is placed in the hopper 137, and thence falls into the injection cylinder 133, where it becomes plastic and fluid through the action of the heating coils 140. The valve control levers 74 and 66 are then moved away from each other, the valve lever 74 and its valve rod being moved to the left, whereas the valve lever 66 and its valve rod are moved to the right. The motor 82 is then started, operating the high and low pressure pumps 3 and 4, respectively. The shut-off valve 13 is then opened, permitting the high pressure fluid from the high pressure pump 3 to pass through the lines 35, 34 and 33 into the flash pressure cylinder 20 on the right-hand side of the piston 27.

On the left-hand side thereof the cylinder 20 has been charged with nitrogen gas through the valve 22 and port 21, this gas being admitted into the cylinder until the desired high pressure has been attained. The pressure fluid from the high pressure pump 3 exerts its force upon the piston 27, moving it to the left against the urge of the high pressure nitrogen gas within the cylinder. When the piston comes to rest against the annular shoulder 26 the pressure within the lines 33, 34 and 35 quickly exceeds the maximum pressure setting of the high pressure pump control mechanism contained within the cylinders 14 and 15 thereof (Figure 1), as determined by the setting of the hand wheel 16. This excessive pressure quickly forces the shift ring of the secondary rotor of the pump into its neutral position, thereby causing the discharge from the high pressure pump 3 to cease.

Meanwhile, with the injector control valve lever 66 in its right-hand position, the pressure fluid passes from the high pressure pump 3 through the lines 35, 34 and 39, the port 40, the injector control valve 6, the port 47 thereof, the pipe 48 and the port 148, into the left-hand side of the injector operating cylinder 91. This forces the injector operating piston 145 to its extreme right-hand position, the surplus fluid being discharged therefrom to the reservoir 7 by way of the pipe 50, the port 49 of the injector control valve 6 and the bottom port 51 thereof (Figure 1). This action causes the injector plunger 142 to be completely retracted and held in its extreme right-hand position, this being the starting position of the injection stroke.

At the same time the shifting of the clamp controlling valve lever 74 to the left into its left-hand position, permits the high pressure fluid from the pump 3 to pass from the high pressure line 37 through the central port 38 of the clamp controlling valve 5, the right-hand port 45 thereof, the pipe 44 and the cylinder port 99, into the right-hand side of the clamping cylinder 90, forcing the clamping piston 93 into its extreme left-hand or retracted position. This is the starting position for the die clamping stroke.

At this time the low pressure pump 4 withdraws fluid from the reservoir 7, through the pipe 52 (Figure 1), and discharges it through pressure relief valve 8, check valve 12, pipes 53 and 42, valve ports 41 and 46 into the reservoir 7, it being unable to overcome the pressure exerted on the opposite side of piston 93 by the discharge from the high pressure pump 3.

In starting the operating cycle the clamping control lever 74 is moved to its extreme right-hand position. The high pressure fluid in the clamping cylinder 90, on the right-hand side of the piston 93, is thereby released, passing through the port 99, the pipe 44, the valve port 45 in the clamp-controlling valve 5 and the bottom port 46 thereof, into the reservoir 7. The discharge of the high pressure pump 3 thenceforth passes through pipe 37, the central port 38 of the clamp-controlling valve 5 and the right-hand port 41, through pipe 42, port 98, into cylinder 90.

Figure 8:
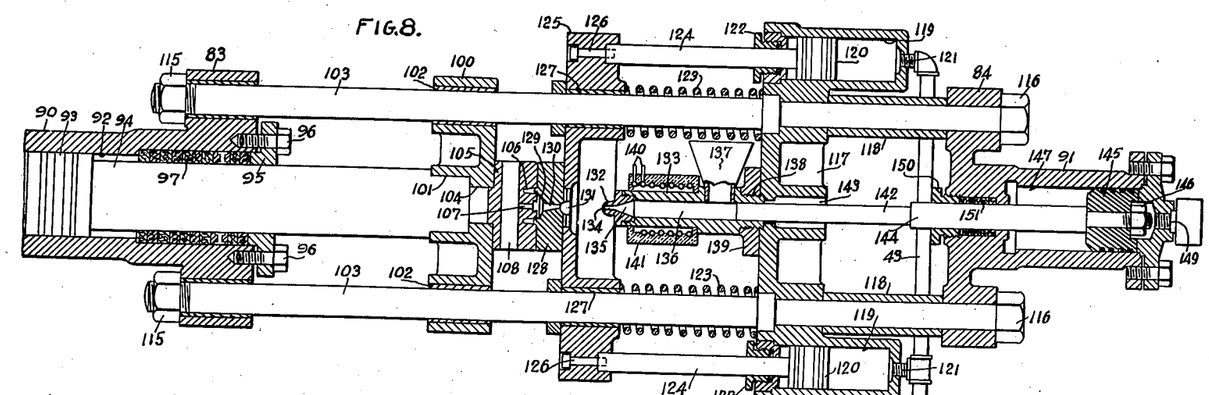
Figure 8 is a view similar to the central portion of Figure 1, showing the die members in engagement with one another prior to their engagement with the injector.

Meanwhile the low pressure pump 4 has been operating and discharging its fluid through pressure relief valve 8, check valve 12, pipes 53 and 42 through port 98 into cylinder 90, along with the discharge from high pressure pump 3, causing piston 93 to move to the right until sufficient resistance is met by the contacting of the die members 105 and 128, as shown in Figure 8, to raise the pressure in the line to a point above that for which low pressure relief valve 8 is set. The pressure from high pressure pump 3 backs through pipe 53 against the check in valve 12, opening pressure relief valve 8, which allows the discharge from low pressure pump 4 to pass unobstructed through pipe 54 into the reservoir 7. The die head 100 continues to move to the right, causing the die member 105 to push the die member 128 and its die head 125 to the right.

Figure 9:
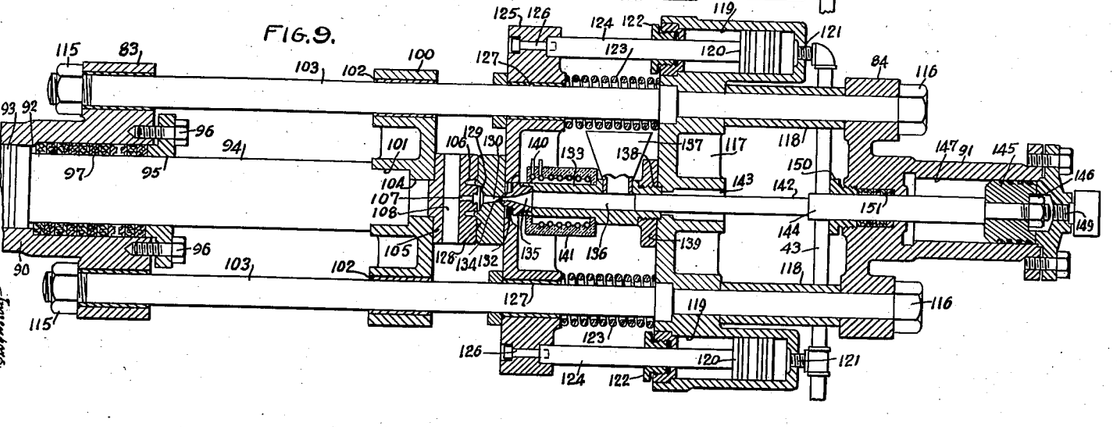
Figure 9 is a view similar to Figure 8 but with the die members in contact with one another and with the injector ready for injection to take place.
Figure 10:
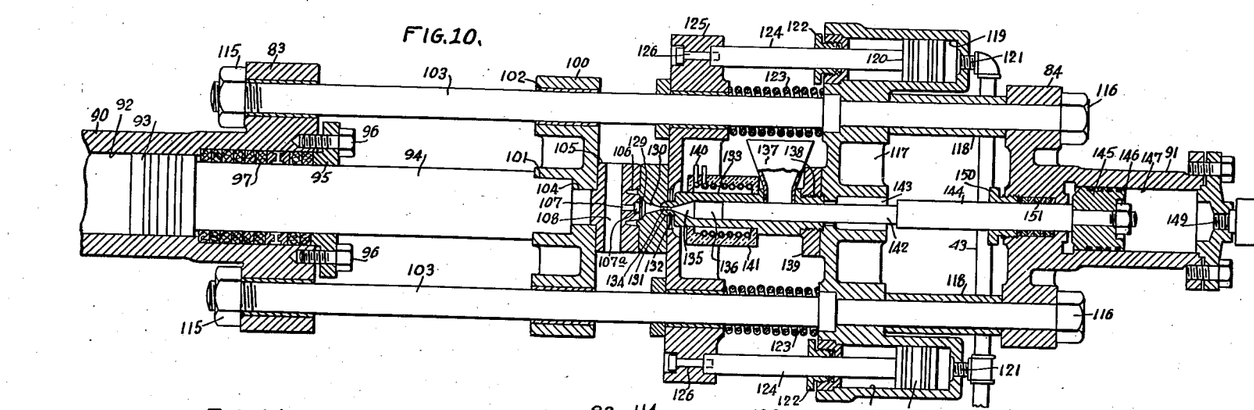
Figure 10 is a view similar to Figure 9 but after injection has taken place.
Figure 11:
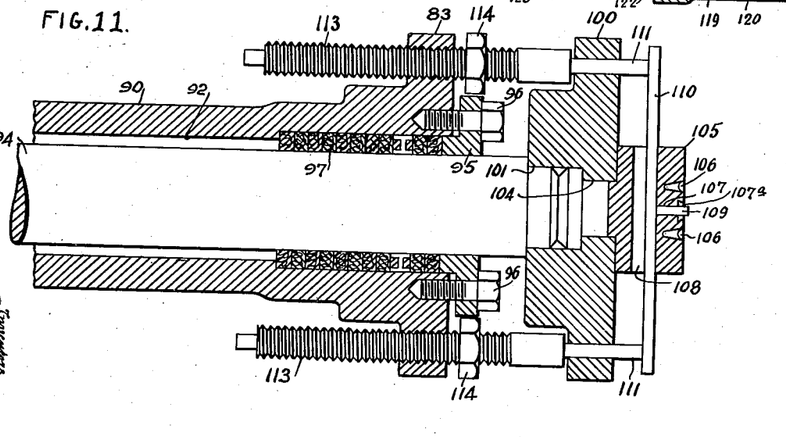
Figure 11 is an enlarged fragmentary oblique section through the ejection mechanism, showing the details thereof.

The fluid from the low pressure pump 4 has been passing through pipes 53 and 42, and the fluid from high pressure pump 3 has been passing through pipe 37, ports 38 and 41; the two combining at the T and thence passing through pipe 43 into port 121 into the right-hand ends of the cushion cylinder bores 119 and there acting against the cushion pistons 120. As the die head 125 continues to move to the right, overcoming the opposite thrust against the cushion pistons 120, the die head 125 encounters the end of the injector cylinder 133 so that the tip of the nozzle 132 enters the recess 131, bringing the die head 125 to rest against the injection cylinder 133, the parts of the press now occupying the positions shown in Figure 9. The pressure in the low pressure circuit thereupon begins to rise and causes the pressure relief valve 8 to open when this pressure exceeds the low pressure limit. The low pressure pump 4 now by-passes its discharge through the line 54 back into the reservoir 7.

It will be observed that the pressure in the cushion cylinder bores 119 cushion the thrust of the die head 125 against the nozzle 132 of the injection cylinder 133, thereby relieving the latter from taking the full load of the clamping cylinder 90, yet permitting the members to seal so that molding material will not leak therefrom. The faces of the two die members 105 and 128 are now firmly clamped together with one another and with the injection cylinder, ready to be filled with the molding material. The latter when hot enough to be sufficiently plastic is ready to inject. The moving parts of the press have now reached the position shown in Figure 9.

To inject the contents of the injection cylinder 133 into the die members 105 and 128, the injector control valve lever 66 is moved to its left-hand position, carrying with it the valve rod connected thereto. When the injector control valve 6 is in this position the high pressure fluid stored in the right-hand end of the flash pressure cylinder 20 is suddenly released, flowing from the pipes 33 and 39, through the central port 40 of the injector control valve 6, thence through the left-hand port 49 thereof, the pipe 50 and the port 149, into the injector operating cylinder 91 to the right of the piston 145 thereof.

The sudden release of pressure against the piston head 145 causes the ejection plunger 142 to be moved suddenly to the left, forcing the contents of the injection cylinder 133 into the chamber within the die members 105 and 128, charging this chamber. The injector control valve lever 66 is then moved to the right, reversing the flow of fluid into the ejector operating cylinder 91 and causing the instantaneous return of the piston 145 to its retracted position. This, in turn, causes the injection plunger 142 to be retracted, permitting a fresh charge of molding material to drop from the hopper 137 into the injection cylinder 133.

While the molding material is cooling within the chamber formed by the die members 105 and 128, the release of the pressure within the flash pressure cylinder 20 permits the release of the mechanism in the cylinders 14 and 15 of the high pressure pump 3, causing the shifting ring of the latter to be moved and the pump discharged to recharge the flash pressure cylinder 20. In this operation the pressure fluid delivered by the high pressure pump 3, through the pipes 35, 34 and 33, again forces the piston head 27 to the left until it engages the annular shoulder 26 between the two portions of the cylinder bore, whereupon the previously described cycle of operation is repeated.

The clamp controlling valve lever 74 is now moved to the left, thereby reversing the flow of fluid into the clamping cylinder 90 and causing the piston 93 thereof to be retracted to its initial position, as shown in Figure 1. The die heads 100 and 125 with their die members 105 and 128 move backward until the cushioning piston heads 120 reach the end of their strokes, whereupon the die members 105 and 128 separate. At this point the molded articles leaves the recesses 129 and 106, but is held by the recess 107a in the end of the bore 107, the recess 107a being slightly tapered in a reverse direction so that the article will be held by it. (Exaggerated for clearness.)

The die head 100 and the die member 105 now continue to move backward until the contact pins 111 encounter the ends of the contact screws 113, stopping the backward motion of the pins 111. The die member 105 continues to move backward but the ejector pin 109 remains stationary through its being mounted upon the transverse rod 110 connected to the ejector pins 111 pushing the molded article out of the recess 107a. This completes an operating cycle of the injection molding press of our invention, another cycle being operated in the same manner.

It will be observed that the flash pressure cylinder 20 is provided with a cylinder head 29 having a depression 31 in its entrance port 32, this depression being engageable with the projection 28 on the piston 27. The purpose of this is to prevent the leakage of the gases within the flash pressure cylinder when the pressure fluid has been withdrawn from the cylinder so that the piston comes to rest against the cylinder head 29. The projection 28 will then enter the depression 31 and seal the cylinder against the escape of gas. This feature is especially valuable when the press is idle for any considerable length of time.

It will be understood that we desire to comprehend within our invention such modifications as come within the scope of our claims and our invention.

Having thus fully described our invention, what we claim as new and desire to secure by Letters Patent is:

1. An injection molding press comprising a frame having a hydraulic cylinder, a piston within said cylinder, a die member operatively connected to said piston, another hydraulic piston, an additional die member movably mounted on said frame and operatively connected to said other hydraulic piston, and means for supplying both of said pistons with pressure fluid whereby to cushion said second die member against the thrust of said first die member.

2. An injection molding press comprising a frame having a hydraulic cylinder, a piston within said cylinder, a die member operatively connected to said piston, another hydraulic piston, an additional die member engageable with said first-named die member and movably mounted on said frame, said additional die member being operatively connected to said other hydraulic piston, yielding means urging said additional die member in the opposite direction from the thrust of said first-mentioned die member, and moving means for injecting molding materials into said die members after said die members engage one another.

3. An injection molding press comprising a frame having a hydraulic cylinder, a piston within said cylinder, a die member operatively connected to said piston, another hydraulic piston, an additional die member engageable with said first-named die member and movably mounted on said frame, said additional die member being operatively connected to said other hydraulic piston, common means for supplying pressure fluid to both of said pistons simultaneously, said other hydraulic piston being arranged to cushion the thrust of the first die member, and moving means connected with said additional die member, said moving means being adapted to inject molding materials into said die members upon the engagement of said die members with one another.

4. An injection molding press comprising a frame having a hydraulic cylinder, a piston within said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, and a flash pressure device for suddenly supplying pressure fluid to said injection operating means.

5. An injection molding press comprising a frame having a hydraulic cylinder, a piston within said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, and a flash pressure device for suddenly supplying pressure fluid to said injection operating means, said flash pressure device comprising a cylinder adapted to be charged with gas under a predetermined pressure, a piston movably mounted in said cylinder and a chamber on the opposite side of said piston from said gas for the reception of pressure fluid pumped into said chamber against the thrust of said gas on said piston.

6. An injection molding press comprising a frame having a hydraulic cylinder, a piston within said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, a flash pressure device for suddenly supplying pressure fluid to said injection operating means, a low pressure pump for initiating the movement of said die members, and a high pressure pump for charging said flash pressure device.

7. An injection molding press comprising a frame having a hydraulic cylinder, a piston within said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, a flash pressure device for suddenly supplying pressure fluid to said injection operating means, said flash pressure device comprising a cylinder adapted to be charged with gas under a predetermined pressure, a piston movably mounted in said cylinder and a chamber on the opposite side of said piston from said gas for the reception of pressure fluid pumped into said chamber against the thrust of said gas on said piston, a low pressure pump for initiating the movement of said die members, and a high pressure pump for charging said flash pressure device.

8. An injection molding press comprising a frame, a pair of mutually engageable die members movably mounted on said frame, a hydraulic piston operatively connected to each die member, an injector adapted to be engaged by one of said die members during the motion thereof, and a third hydraulic piston arranged to inject the contents of said injector into the space within said die members after said die members engage one another.

9. An injection molding press comprising a frame, a pair of mutually engageable die members movably mounted on said frame, a hydraulic piston operatively connected to each die member, an injector adapted to be engaged by one of said die members during the motion thereof, and a third hydraulic piston arranged to inject the contents of said injector into the space within said die members after said die members engage one another, the hydraulic piston connected to one of said die members being arranged to cushion the thrust of the hydraulic piston impelling the other die member into engagement with the injector.

10. An injection molding press comprising a frame, a pair of mutually engageable die members movably mounted on said frame, a hydraulic piston operatively connected to each die member, an injector adapted to be engaged by one of said die members during the motion thereof, means arranged to inject the contents of said injector into the space within said die members after said die members engage one another, a flash pressure device for operating said injecting means, a pump for charging said flash pressure device, and a pressure-responsive valve arranged to permit the discharge of said pump to be applied to said hydraulic pistons when said flash pressure device becomes charged.

11. An injection molding press comprising a frame having a hydraulic cylinder, a piston within said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, and a flash pressure device having means for moving a definite quantity of fluid within the same for suddenly supplying pressure fluid to said injection operating means for the power stroke thereof, and means for operating said pistons, and the moving means of said flash pressure device in timed relation to each other.

12. An injection molding press comprising a frame having a hydraulic cylinder, a piston with said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, and a flash pressure device for suddenly supplying pressure fluid to said injection operating means, said flash pressure device comprising a cylinder adapted to be charged with gas under a predetermined pressure, a piston movably mounted in said cylinder for moving a definite quantity of pressure fluid in said cylinder and a chamber on the opposite side of said piston from said gas for the reception of pressure fluid pumped into said chamber against the thrust of said gas on said piston, and means for operating said hydraulic cylinder pistons and the piston of said flash pressure device in timed relation to each other.

13. An injection molding press comprising a frame having a hydraulic cylinder, a piston within said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, a flash pressure device for moving a definite quantity of fluid and for suddenly supplying pressure fluid to said injection operating means, a low pressure pump for initiating the movement of said die members, and a high pressure pump for charging said flash pressure device.

14. An injection molding press comprising a frame having a hydraulic cylinder, a piston within said cylinder, a die member operatively connected to said piston, an additional die member movably mounted on said frame, an additional hydraulic piston, said additional die member being operatively connected to said additional hydraulic piston, an injector arranged to inject molding materials into one of said die members, moving means associated with said injector for performing said injection, a flash pressure device for suddenly supplying pressure fluid to said injection operating means, said flash pressure device comprising a cylinder adapted to be charged with gas under a predetermined pressure, a piston movably mounted in said cylinder and a chamber on the opposite side of said piston from said gas, said chamber having a cylindrical space for the reception of a definite amount of pressure fluid pumped into said chamber against the thrust of said piston, a low pressure pump for initiating the movement of said die members, and a high pressure pump for charging said flash pressure device, and means for operating said hydraulic cylinder pistons and the piston of said flash pressure device in timed relation to each other.

15. An injection molding press comprising a frame, a pair of mutually engageable die members movably mounted on said frame, a hydraulic piston operatively connected to each die member, an injector adapted to be engaged by one of said die members during the motion thereof, a third hydraulic piston arranged to inject the contents of said injector into the space within said die members after said die members engage one another, a low pressure pump for initiating the movement of the die-moving piston, a flash pressure device comprising a chamber for storing a definite amount of fluid under pressure and for delivering the stored fluid to the injector, and a high pressure pump for charging the flash pressure device, and means for operating said high and low pressure pumps in timed relation to each other.

16. An injection molding press comprising a frame, a pair of mutually engageable die members movably mounted on said frame, a hydraulic piston operatively connected to each die member, an injector adapted to be engaged by one of said die members during the motion thereof, means arranged to inject the contents of said injector into the space within said die members after said die members engage one another, a flash pressure device including a cylindrical storage space for storing a definite amount of fluid for operating said injecting means, a pump for charging said flash pressure device, and a pressure-responsive valve arranged to permit the discharge of said pump to be applied to said hydraulic pistons when said flash pressure device becomes charged, said pump including pressure-responsive means for reducing the discharge therefrom in proportion to the rise in pressure, the limiting pressure thereof exceeding the charging pressure of said flash pressure device.

VICTOR S. SHAW.
LESLIE S. HUBBERT.